United States Patent Office 3,230,280
Patented Jan. 18, 1966

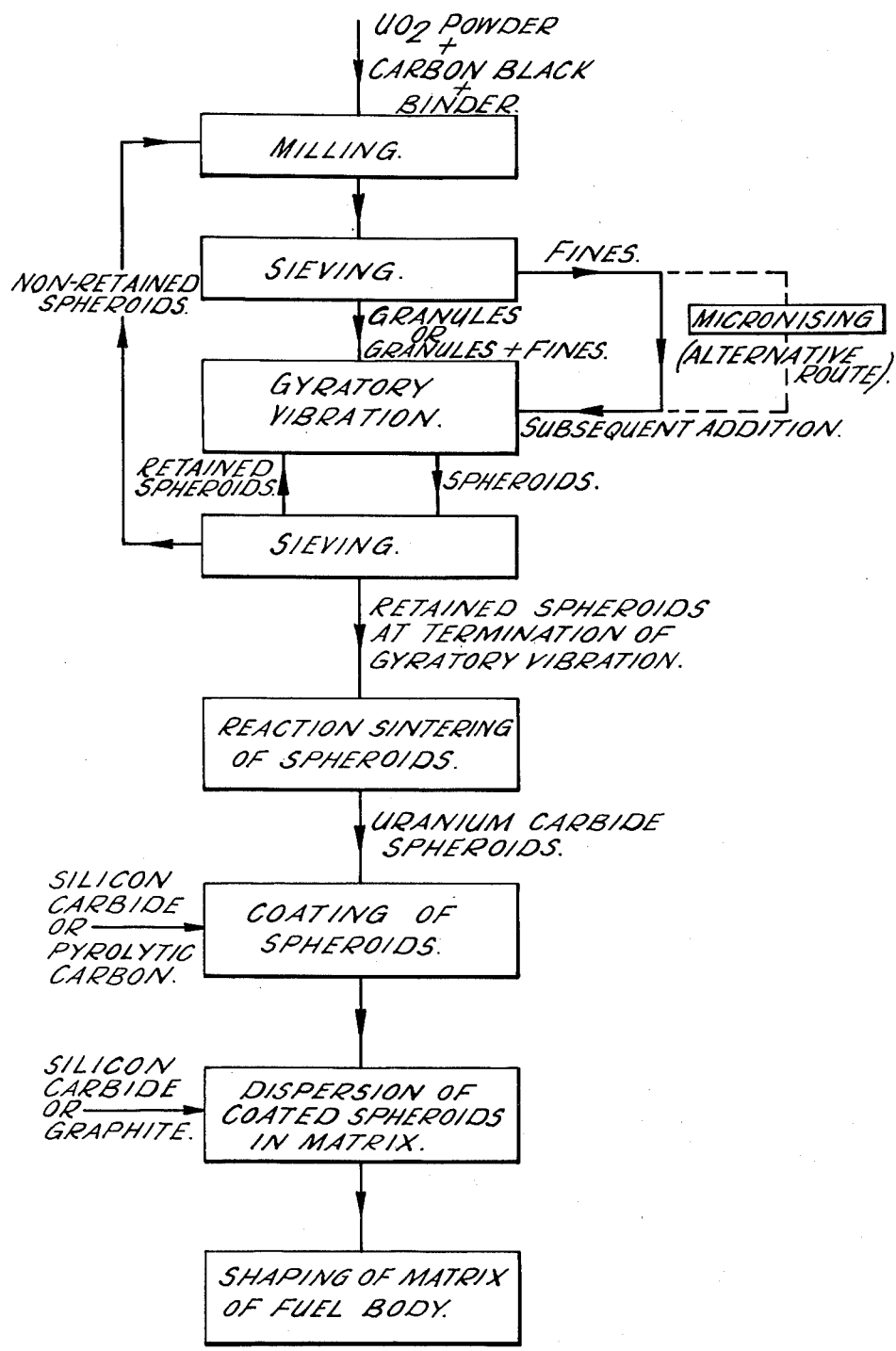

3,230,280
PROCESS OF PRODUCING SPHEROIDS OF NUCLEAR FUEL MATERIALS BY AGGLOMERATION
Peter Kennedy, Penwortham, Preston, England, assignor to United Kingdom Atomic Energy Authority, London, England
Filed June 19, 1963, Ser. No. 288,892
Claims priority, application Great Britain, July 3, 1962, 25,546/62
6 Claims. (Cl. 264—.5)

This invention relates to the production of spheroids and is particularly concerned with the spheroidisation of irregularly shaped granules of fissile or fertile material, the spheroids so formed being employable in the production of nuclear fuel.

In our copending application No. 200,495, filed June 6, 1962, there is described and claimed a method of producing spheroids from irregularly shaped granules of material by placing the granules in an annular dish having an abrasive surface, and applying a gyratory vibration to the dish to cause the granules to move around the dish until substantially speroidal. The said application also describes and claims suitable apparatus for performing the said method.

It has been found that variation of initial granule size and of the period during which the granules were subjected to gyration had little or no effect on the ultimate size of the spheroids, this being substantially constant depending on the materials employed. However, there was remarkable uniformity of spheroid size in spite of the apparent invariability thereof. It has also been found that the degree of abrasiveness of the surface of the annular dish to which is imparted a gyratory vibration has little effect on the ultimate size of the spheroids.

It is therefore an object of this invention to provide a process of producing spheroids by means of which variation of the size of the spheroids can be effected as desired.

According to the present invention, a process of producing spheroids of fissile or fertile material of a mixture thereof, comprises the steps of placing granules of the material in a container, applying a gyratory vibration to the container so as to cause the granules to be moved over the internal surface of the container and thereby form spheroids of the material, and, after formation of spheroids, causing enlargement of spheroids to a desired size by addition of further quantities of said material.

The said powder may be produced prior to spheroidising process ready to be used therein. Some of the powder for addition may however be produced during the spheroidising process by periodically stopping the gyratory vibration, sieving the spheroids in course of production to remove any undersized spheroids, and grinding the removed undersized spheroids to produce powder for addition.

It is found, unexpectedly, that a large proportion of the added powder instead of forming fresh spheroids as could be expected, in fact associates itself with spheroids already in existence when the addition takes place and causes growth of such spheroids whilst retaining their spheroidal shape.

The nature of the surface of the container over which the granules and formed spheroids are moved appears to be of little significance, except that a very coarse abrasive surface is not desirable in order to avoid powder pick-up and production of a powder bed which tends to happen with a coarse abrsaive surface. Spheroidisation appears to proceed equally well with a fine abrasive surface or with a smooth surface. It is desirable however to avoid the use of surfaces which absorb the material being spheroidised.

In order that the process according to the invention may be readily understood, reference is directed to the accompanying drawing, of which the sole figure illustrates in flow-sheet form the various steps of the process which will hereinafter be described in some detail.

In a typical example, 500 grams of uranium dioxide (ceramic grade—surface area 3 m.$^2$/grams), 67 grams of carbon black (surface area 17 m.$^2$/gram) and 0.25% by weight of aluminium stearate are steel-ball milled in a rubber or rubber-lined pot for 16 hours, which effects mixing of the constituents and produces granules of the mixture, the granules having an oval or approximately spheroidal shape. The granules are transferred to a bowl formed of polyethylene, the bowl being secured to the conventional sieve-shaker which imparts both reciprocating motion in a vertical plane and oscillatory angular motion in a horizontal plane to the bowl. This gyratory vibration causes the granules to be moved relative to the floor and wall of the bowl and effects spheroidisation of the granules to a remarkably constant size (usually about 230 microns diameter) and perfection of spheroidal shape.

Once spheroids of this size have been produced, they can be "grown" to any desired diameter by the addition of powder. Such powder may be produced by sieving the ball-milled material using a 100 mesh sieve, that which is retained by the sieve being employed for the initial spheroidisation and that which is passed by the sieve ("fines") being employed for powder addition. Alternatively unsieved ball-milled material, consisting of both "fines" and granules, may be employed as the powder. A suitable initial rate of addition of powder is about 25 grams every fifteen minutes. This rate of addition is maintained until the growing spheroids reach diameters of about 400 microns. The rest of addition can then be stepped up to about 25 grams every minute if further growth of the spheriods is desired, and the spheriods may be grown to a desired size.

Spheroids of up to 1 mm. diameter have been successfully produced. A suitable size for spheroids produced from the materials specified in the said example and intended for application as nuclear fuel is 700–750 microns diameter. Such spheroids are reaction-sintered in a furnace under vacuum, which removes the carbon monoxide generated by the reaction, and the sintered spheroids may be coated with a suitable fission-product-retaining coating, for example silicon carbide or pyrolytic carbon, and the coated spheroids dispersed in a suitable matrix, which may be of silicon carbon or graphite, which matrix is formed to a desired shape of fuel body, several such fuel bodies being employed in a nuclear reactor fuel element.

It has been found advantageous to interrupt spheroidisation at intervals of about 1 hour and to sieve the spheroids already produced to remove any undersized spheroids before continuing spheroidisation of the spheroids retained by the sieve. The undersized spheroids are then returned to the ball mill and converted to powder for addition as aforesaid. At the conclusion of spheroidisation, sieving may be again employed for the purpose of the final grading of the spheroids sent forward to the reaction-sintering step. Typically it is found that only about 5% of the spheroids fail to reach a selected standard of size and shape. These of course can be returned to the ball mill for use in a subsequent spheroidising operation.

The spheroids after reaction-sintering are found to possess dense and non-porous characteristics which are particularly advantageous for nuclear fuel applications.

It has also been discovered that even higher density spheroids can be obtained and that the control of size of spheroids is further enhanced if the powder is "micronised" prior to the gyration step. "Micronisation" is a process wherein powder is blown in a stream of compressed air into a chamber in which a vortex is set up by a series of obliquely introduced jets of air. Thus the powder is carried round in the vortex of air in the chamber and is broken down partly it is thought due to self attrition and partly due to expansion of trapped air in the powder when the compressed air carrying the powder enters the chamber and reduces in pressure.

In another application, uranium dioxide of similar description to that employed in the foregoing example may be granulated by being similarly ball-milled, or be granulated by any other suitable means, the granules spheroidised, and the spheroids grown by addition of powder. The uranium dioxide spheroids of a desired size may be sintered in conventional manner and employed for nuclear fuel, for example by being coated with beryllia and the coated spheroids dispersed in a beryllia matrix formed into a desired shape of fuel body.

Alternatively, uranium dioxide spheroids can be produced by employing uranium dioxide powder which has been micronised to produce a surface area of the powder of 3.1 m.$^2$/gram, the powder being added to 200 grams of ball-milled uranium dioxide granules retained by a 100 mesh sieve, after a period of gyratory vibration of the granules to produce spheroids, at the rate of 10 grams every fifteen minutes. Once the spheroids have been built up by the powder addition to diameters of about 400 microns, the addition rate is increased to about 10 grams per minute and is continued until spheroids of the required diameter are produced.

For production of spheroids of diameter less than about 230 microns, ball-milled or micronised material is applied to a 300 mesh sieve, the material retained is subjected to spheroidisation as aforesaid, and the material passed by the sieve is employed for power addition to cause the spheroids to grow to the desired size.

I claim:
1. A process of producing spheroids comprising the steps of providing granules of a material selected from the group of fertile nuclear materials, fissile nuclear materials and mixtures thereof in a container, applying a vibratory gyration to the container to cause the granules to be moved over the internal surface of the container and thereby form spheroids of the material, adding to the container, after the spheroids therein are of at least substantially constant size, further quantities of said material including at least some particles smaller than the granules originally provided in the container, and continuing vibratory gyration of the container to cause enlargement of the spheroids.

2. A process according to claim 1 wherein initial addition of said further quantities of said materials is at a lower rate than subsequent addition.

3. A process according to claim 1, wherein the added material includes micronised powder.

4. A process according to claim 1, including cessation of gyratory vibration of said container at intervals to permit sieving of the spheroids and removal of undersized spheroids, the removed undersized spheroids being reground for subsequent addition as powder.

5. A process according to claim 1, wherein the internal surface of said container is smooth.

6. A process according to claim 1, wherein the internal surface of said container is fine-abrasive in character.

References Cited by the Examiner
UNITED STATES PATENTS

| | | | |
|---|---|---|---|
| 1,994,718 | 3/1935 | Lellep | 18—1 |
| 2,746,083 | 5/1956 | King | 18—1 |

LEON D. ROSDOL, *Primary Examiner.*
L. DEWAYNE RUTLEDGE, CARL D. QUARFORTH,
*Examiners.*